(12) United States Patent
Cumby et al.

(10) Patent No.: US 8,639,682 B2
(45) Date of Patent: Jan. 28, 2014

(54) ENTITY ASSESSMENT AND RANKING

(75) Inventors: Chad Michael Cumby, Chicago, IL (US); Katharina Probst, Atlanta, GA (US); Rayid Ghani, Chicago, IL (US)

(73) Assignee: Accenture Global Services Limited, Dublin (IE)

(*) Notice: Subject to any disclaimer, the term of this patent is extended or adjusted under 35 U.S.C. 154(b) by 1028 days.

(21) Appl. No.: 12/344,738

(22) Filed: Dec. 29, 2008

(65) Prior Publication Data

US 2010/0169375 A1    Jul. 1, 2010

(51) Int. Cl.
G06F 7/00 (2006.01)

(52) U.S. Cl.
USPC .......................................... 707/708; 707/749

(58) Field of Classification Search
USPC .................. 707/708, 731, 749; 705/1.1; 704/238–239
See application file for complete search history.

(56) References Cited

U.S. PATENT DOCUMENTS

| | | | |
|---|---|---|---|
| 5,943,670 A * | 8/1999 | Prager ................................. | 1/1 |
| 6,018,738 A * | 1/2000 | Breese et al. ................. | 707/749 |
| 6,144,964 A * | 11/2000 | Breese et al. ................. | 707/758 |
| 6,345,264 B1 * | 2/2002 | Breese et al. ................. | 706/21 |
| 6,397,215 B1 | 5/2002 | Kreulen et al. | |
| 6,496,838 B1 | 12/2002 | Zamora-McKelvy et al. | |
| 7,343,302 B2 * | 3/2008 | Aratow et al. ................. | 705/325 |
| 7,630,986 B1 * | 12/2009 | Herz et al. ................. | 1/1 |
| 7,644,144 B1 * | 1/2010 | Horvitz et al. ................. | 709/223 |
| 7,747,719 B1 * | 6/2010 | Horvitz et al. ................. | 709/223 |
| 7,769,751 B1 * | 8/2010 | Wu et al. ................. | 707/728 |
| 2004/0006559 A1 * | 1/2004 | Gange et al. ................. | 707/3 |
| 2006/0136411 A1 * | 6/2006 | Meyerzon et al. ................. | 707/5 |
| 2007/0118399 A1 * | 5/2007 | Avinash et al. ................. | 705/2 |
| 2007/0208701 A1 | 9/2007 | Sun et al. | |
| 2007/0226160 A1 * | 9/2007 | Acharya ................. | 706/47 |
| 2008/0104032 A1 * | 5/2008 | Sarkar ................. | 707/3 |
| 2008/0228750 A1 | 9/2008 | Zaragoza | |
| 2008/0235209 A1 * | 9/2008 | Rathod et al. ................. | 707/5 |
| 2008/0256026 A1 | 10/2008 | Hays | |

FOREIGN PATENT DOCUMENTS

| | | |
|---|---|---|
| EP | 1225537 | 7/2002 |
| WO | WO-98/09229 | 3/1998 |
| WO | WO-2006/130658 | 12/2006 |

OTHER PUBLICATIONS

"Retrieval and Ranking of Entities for Enterprise Knoweldge Management Tasks", Chad Cumby, Submitted to SIGIR 2008.

* cited by examiner

*Primary Examiner* — James Trujillo
*Assistant Examiner* — Linh Black
(74) *Attorney, Agent, or Firm* — Mannava & Kang, P.C.

(57) ABSTRACT

General entity retrieval and ranking is described. A first set of documents is retrieved from one or more document repositories based on a query formed according to the topic. The first set of documents is characterized based on its first set of metadata values. One or more candidate entities are identified based on the first set of documents and the original query is thereafter augmented according to a candidate entity. The second set of documents resulting from the augmented query is then characterized in a similar manner. For each candidate entity, the first and second document set characterizations are compared to determine their degree of similarity. Increasingly similar document set characterizations indicates that the candidate entity is increasingly relevant to the original query. Repeating this process for each of the one or more candidate entities can give rise to rankings according to the respective degrees of similarity.

18 Claims, 4 Drawing Sheets

ENTITY ASSESSMENT AND RANKING

FIELD OF THE INVENTION

The instant disclosure relates generally to ranking systems and, in particular, to techniques for assessing and ranking entities.

BACKGROUND OF THE INVENTION

With the advent of the World Wide Web and Internet, the volume of publicly available information has grown at an unprecedented rate. In order to make sense of this ever-expanding collection, significant attention has been paid to the development of improved document searching techniques, such as search engines and the like. While such techniques have greatly improved the speed, cost and accuracy of locating relevant documents in an essentially unstructured knowledge base, the realm of entity retrieval and ranking, until recently, has been the subject of limited research. As used herein, an entity is defined by its ability to be described by one or more nouns, e.g., a person, place or thing. By way of non-limiting example, in the context of commercial enterprises, entities may comprise employees, clients, projects, partners, alliances, facility locations, competitors, etc. Of course, similar entities will be readily apparent in numerous endeavors beyond the commercial context. Regardless, the ability to quickly identify entities relevant to a given topic of interest will find application in a wide variety of applications.

For example, referring again to the commercial context, the preparation of business proposals may be made more efficient if one is able to quickly identify subject matter experts within the organization submitting the proposal. In a similar vein, the ability to accurately identify the most qualified potential team members with specific skill sets would improve project staffing. Further still, identifying the best vendors for certain equipment or service needs would be greatly simplified through provision of a system that enables quick and accurate identification of relevant entities. Stated more generally, various knowledge management tasks can be greatly simplified or assisted by delivering relevant information about entities to those responsible for such knowledge management tasks.

Currently, it is very difficult to retrieve entity-related information. In a business context, any commercial enterprise search engine, in a manner akin to web search engines, will yield a list of documents relevant to a particular topic query. However, such engines are of little help in retrieving a reliable ranked list of entities relevant to the topic, and it is left to the requester to sift through the returned documents to identify any particularly relevant entities.

More recently, entity, and especially expert, ranking has received a growing amount of attention. For example, the Initiative for the Evaluation of XML Retrieval (INEX) has introduced an entity ranking track. Such systems currently rely on the retrieved entities being marked up with Extensible Markup Language (XML). However, not all content within a given knowledge base may have entities tagged with appropriate mark-up. The Text Retrieval Conference (TREC) recently introduced an enterprise track, including an expert finding task. In one approach, a list of experts is provided and, for a given expert, a pseudo-document is created from all documents located that include a mention of that expert. In another approach, potentially relevant documents for a topic are retrieved and experts are subsequently extracted from (i.e., identified in) the set of documents. Ranking of the extracted experts according to their relevance to the topic is inferred by the number of mentions for each expert; more mentions results in higher rankings. However, to the extent that the number of mentions of an expert in a set of documents is subject to numerous other factors beyond relevance to a given topic, such systems are susceptible to providing inaccurate results. Further still, some expert identification techniques exploit structural information of documents, such as references from other, topically relevant documents or, in the example of emails, explicit links to other emails. With regard to these expert identification techniques, expert retrieval, while important, is appropriately viewed as a subset of entity retrieval and ranking and is thus limited in scope. That is, a more general entity retrieval and ranking approach represents a more scalable solution allowing for application to a wider variety of situations, and would therefore represent an advancement in the art.

SUMMARY OF THE INVENTION

The instant disclosure describes techniques for general entity retrieval and ranking based on specific topic queries directed to document repositories. In particular, the instant disclosure describes techniques that leverage the availability of metadata about the documents being searched, which metadata is often more available in enterprise document repositories. The disclosed techniques may be implemented using suitable processing devices, such as general purpose or application specific computers, or other equivalent implementation techniques known in the art.

In one embodiment, a user may directly, or via an intervening component, provide a topic that is subsequently formed into a query. Based on the query, a first set of documents is retrieved from one or more document repositories, for example via a suitable search engine. The first set of documents have first metadata values for a corresponding plurality of metadata attributes. The first set of documents is then characterized based on the first set of metadata values. One or more candidate entities are then identified based on the first set of documents. For example, candidate entities may be identified through text-extraction applied to the first set of documents, the number of mentions in the first set of documents or directly from the first metadata values. In one embodiment, the one or more candidate entities are selected according to an entity type, potentially provided by the querying user.

Thereafter, the original query is augmented according to the one or more candidate entities. That is, document repository(ies) are searched again based on the original query and one of the candidate entities. The resulting second set of documents is then characterized on the basis of the same metadata attributes and the second metadata values associated with the second set of documents. In one embodiment, a document set is characterized by creating a vector in which each of the metadata values constitutes a separate dimension, optionally with weighting values for specific metadata values applied. Regardless, the first and second document set characterizations are then compared (e.g., through a vector comparison) to determine their degree of similarity. Increasingly similar document set characterizations lead to the inference that the candidate entity giving rise to the second document set is increasingly relevant to the original query. The intuition behind this metric is that the metadata values provide a detailed model of the documents in a retrieved set. Further, the metadata describes not only the content of each document (e.g., by automatic retrieval of named entities or keywords), but also other information associated with it. In other words, it describes the "essence" of the document along with all relevant data about it, e.g., its type, associated part of an organization, etc. Repeating this process for each of the one or more candidate entities can give rise to rankings according to the respective degrees of similarity, which rankings can be subsequently provided in ordered list form. In this manner, the disclosed techniques represent an advancement in the art.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
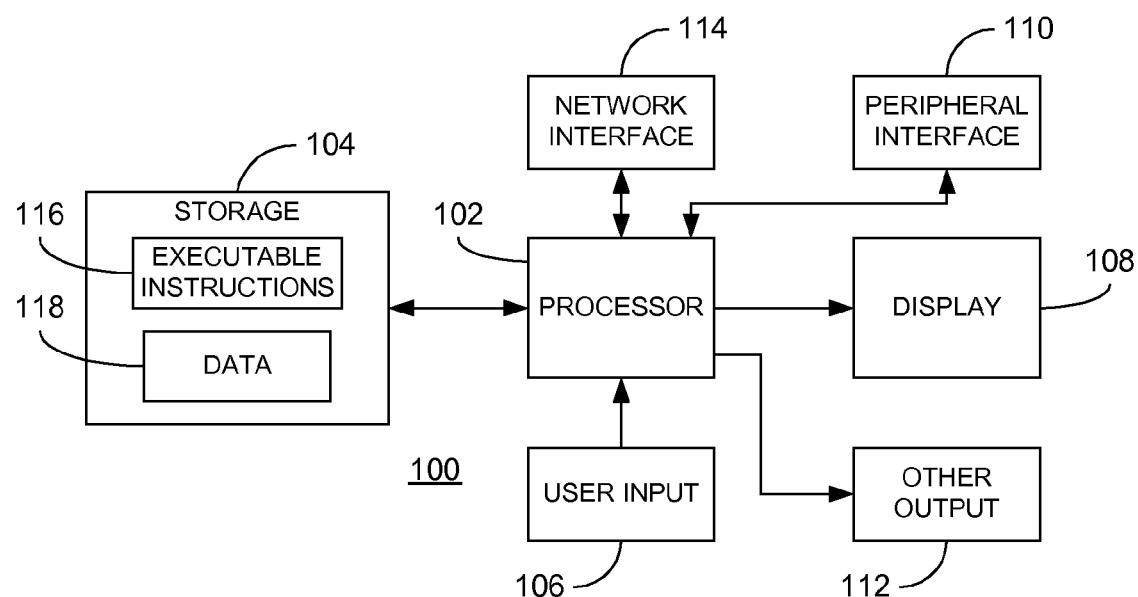
FIG. 1 is a block diagram of a processing device the may be used to implement the various techniques described herein.

FIG. 1 illustrates an exemplary processing device 100 that may be used to implement the teachings of the instant disclosure. The device 100 may be used to implement, for example, one or more components of the system 400, as described in greater detail below. Regardless, the device 100 comprises a processor 102 coupled to a storage component 104. The storage component 104, in turn, comprises stored executable instructions 116 and data 118. In an embodiment, the processor 102 may comprise one or more processing devices such as a microprocessor, microcontroller, digital signal processor, or combinations thereof capable of executing the stored instructions 116 and operating upon the stored data 118. Likewise, the storage component 104 may comprise one or more devices such as volatile or nonvolatile memory including but not limited to random access memory (RAM) or read only memory (ROM). Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may comprise one or more user input devices 106, a display 108, a peripheral interface 110, other output devices 112 and a network interface 114 in communication with the processor 102. The user input device 106 may comprise any mechanism for providing user input (such as inputs specifying query topics, entity types, etc. as described below) to the processor 102. For example, the user input device 106 may comprise a keyboard, a mouse, a touch screen, microphone and suitable voice recognition application or any other means whereby a user of the device 100 may provide input data to the processor 102. The display 108, may comprise any conventional display mechanism such as a cathode ray tube (CRT), flat panel display, or any other display mechanism known to those having ordinary skill in the art. The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as a one form for implementing the techniques described herein, those having ordinary skill in the art will appreciate that other, functionally equivalent techniques may be employed. For example, as known in the art, some or all of the executable instruction-implemented functionality may be implemented using firmware and/or hardware devices such as application specific integrated circuits (ASICs), programmable logic arrays, state machines, etc. Further still, other implementations of the device 100 may include a greater or lesser number of components than those illustrated. Once again, those of ordinary skill in the art will appreciate the wide number of variations that may be used is this manner.

Figure 2:
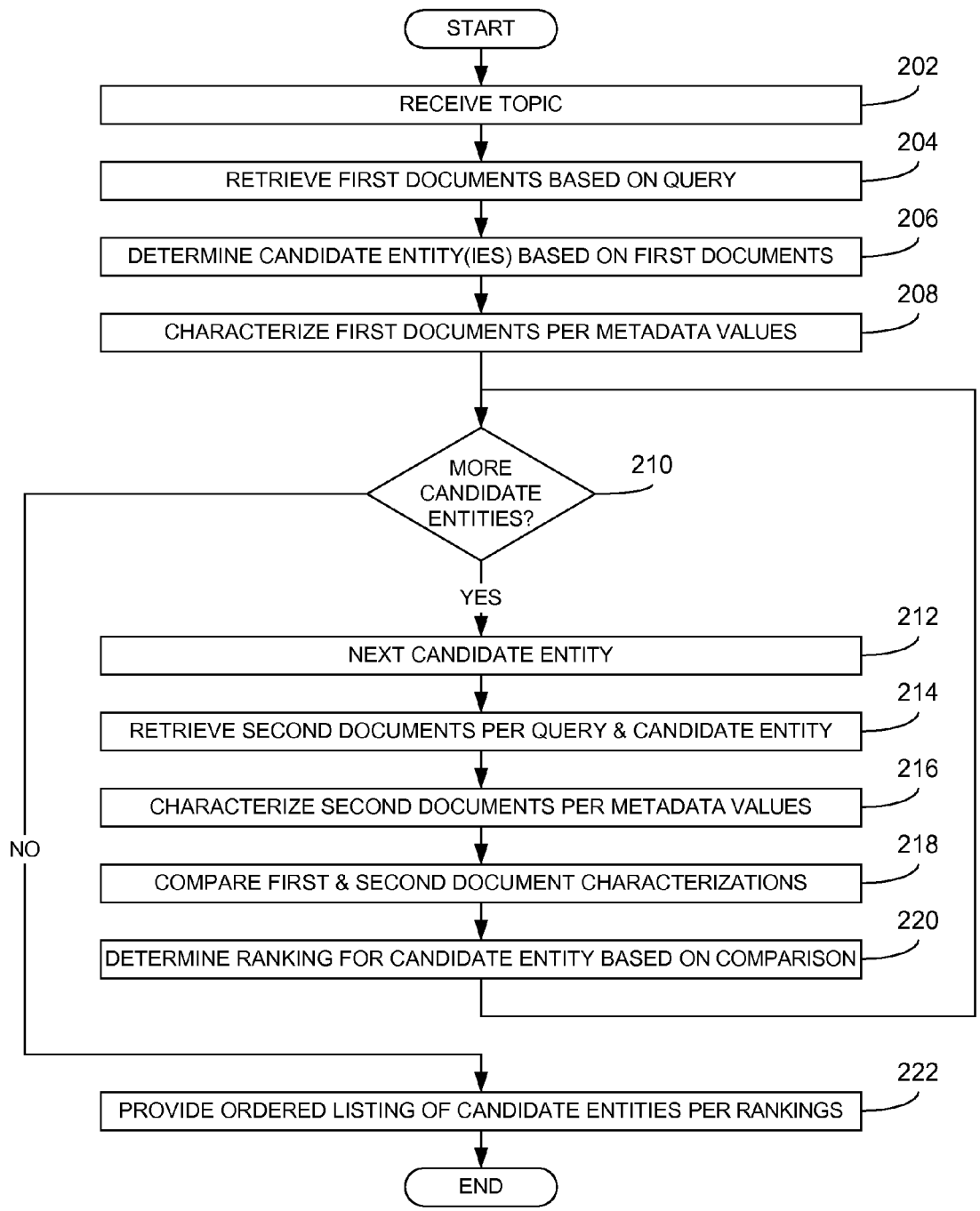
FIG. 2 is a flowchart of processing in accordance with the instant disclosure.

Referring now to FIG. 2, processing in accordance with the instant disclosure is further described. While the processing illustrated in FIG. 2 may be implemented as stored instructions executed on one or more processors (as in FIG. 1), those of ordinary skill in the art will appreciate that other implementation techniques are possible. Regardless, processing begins at block 202 where information concerning a given topic, t, is received. In one embodiment described below relative to FIG. 4, the topic information is received directly from a user via an appropriate user interface. However, the instant disclosure is not limited in this regard; the topic information may be received from an intervening device (e.g., a suitable computer not implementing a user interface) configured to provide the topic input.

Regardless of the manner in which the topic is received, processing continues at block 204 where the topic is used as the basis for retrieving a first set of documents. In one embodiment, this is done by fashioning the topic into a query, $q_t$, suitable for submission to an appropriate search engine. A typical query may be formatted as one or more keywords that may optionally include logical operators (e.g., "and", "or", "not", etc.) as known in the art. The keywords may be taken directly from the received topic information or indirectly determined, e.g., a topic expressed in natural language form and parsed for keywords, as further known in the art. Based on the query, the search engine searches documents in one or more repositories for documents meeting the query. For example, the "FAST" enterprise search engine provided by Fast Search & Transfer may be used for this purpose, although other search engines may be equally employed.

Once the first set of documents, $R_t$, has been retrieved in response to the query, processing continues at block 206 where one or more candidate entities, $e_i$, are identified based on the first set of documents. In one embodiment, entities annotated by the document metadata may be used for this purpose. Alternatively, conventional entity extraction techniques may be employed. For example, the "FAST" search engine noted above possesses a named entity recognition capability that may be used to extract various entities. In this example, the search engine indexes automatically extracted entities such as companies, people, keywords, locations, acronyms, etc. as well as manually provided entities such as project, client, project contact, etc. from the documents in the first set of documents. Those having ordinary skill in the art will appreciate that other algorithms may be employed for this purpose. Regardless of the manner in which they are identified, occurrence frequencies for each entity, $cnt_{e_i}$, may be generated across the first set of documents. Based on the occurrence frequencies, only a top portion of the entities, i.e., those having the highest occurrence frequencies, are used as candidate entities for subsequent processing. This may accomplished by choosing only the top n candidate entities as ranked by the occurrence frequencies or by thresholding the candidate entities, i.e., selecting those candidate entities where $cnt_{e_i} \geq$ CountThreshold.

In one embodiment, an entity type may be specified prior to the entity identification process. Examples of entity types include, but are not limited to, "companies", "people", "projects", "locations", etc. Generally, the types of entities specified may depend on the nature of the topic. Regardless, the entity type may be specified by the user in the same manner used to specify the topic or in an automated fashion.

Having identified one or more candidate entities, $e_i$, processing continues at block 208, where the first set of documents is characterized. Characterization of document sets, as used herein, summarizes the nature or makeup of the documents within the document set in a manner that facilitates comparisons with other document sets. To this end, in one embodiment, characterization of documents sets is carried out through the use of metadata associated with the documents in a document set. Often, metadata attributes (and their corresponding values) carry important information about each document, and in aggregation they carry enough information to describe the document base, or the subset of the collection that is described by a query.

One of the main differences between enterprise information retrieval and web retrieval is that in the enterprise context, each document in a collection typically has metadata associated therewith. While documents themselves may have few direct links to each other, the process of collection, storage, and authorship often creates a rich set of information on many attributes of the items in question. In the case, for example, of a project-based consulting organization, a set of submitted documents might be annotated with values for attributes about the project for which they were created. Such attributes could include the creator of a document, his/her employee level, specialization, location, the date/time the document was submitted, the client of the project, any vendors or technologies used, business contacts for the project, dates for objective completions, etc.

Typically, such metadata is entered at the time that a document is added to a content database or document repository. However, even if metadata is not captured at the time of data submission, off-the-shelf technologies are available to extract simple entities such as people, locations, organizations, and acronyms used. Regardless of the manner in which it is obtained, the instant techniques may performed using a relatively small number of metadata attributes and attribute values up to hundreds of attributes having dozens of values. For example, Table 1 illustrates metadata attributes and values associated with documents taken from a content database of a large consulting firm. The particular examples illustrated in FIG. 1 were drawn from a document set retrieved in response to the query "BP drilling". The numbers in parentheses indicate the number of documents that are associated with the particular metadata value in the retrieved set.

TABLE 1

| Attribute | Example Values |
|---|---|
| Language | Albanian, Arabic, Albanian, Arabic, Bulgarian, Catalan, Chinese (simple), Chinese (traditional), Finnish, Japanese, Polish, Russian, Slovak, Spanish, Swedish, Thai, Turkish |
| Acronyms | bim = business integration methodology<br>erp = enterprise resource planning<br>bpo = business process outsourcing<br>edi = electronic data interchange<br>crm = customer relationship management |
| Companies | ExxonMobil (137)<br>Texaco (114)<br>Statoil (110)<br>Unocal (98)<br>PeopleSoft (94) |
| Keywords | Supply Chain (134)<br>Finance (61)<br>Performance Management (61)<br>Procure to Pay (54) |
| Locations | America (252)<br>Canada (209)<br>Asia (206) Houston (206)<br>Texas (184) |
| Industry Keywords | Energy (301)<br>Upstream (168) Utilities (29)<br>Gas & Power (25)<br>Government (23) |
| Offerings | Resources (188)<br>Outsourcing & BPO (155)<br>Human Performance (155)<br>HR Transformation (115) |
| Vendor Keywords | SAP (55)<br>Oracle (31)<br>Alcatel (11)<br>Plumtree (9) |

Figure 3:
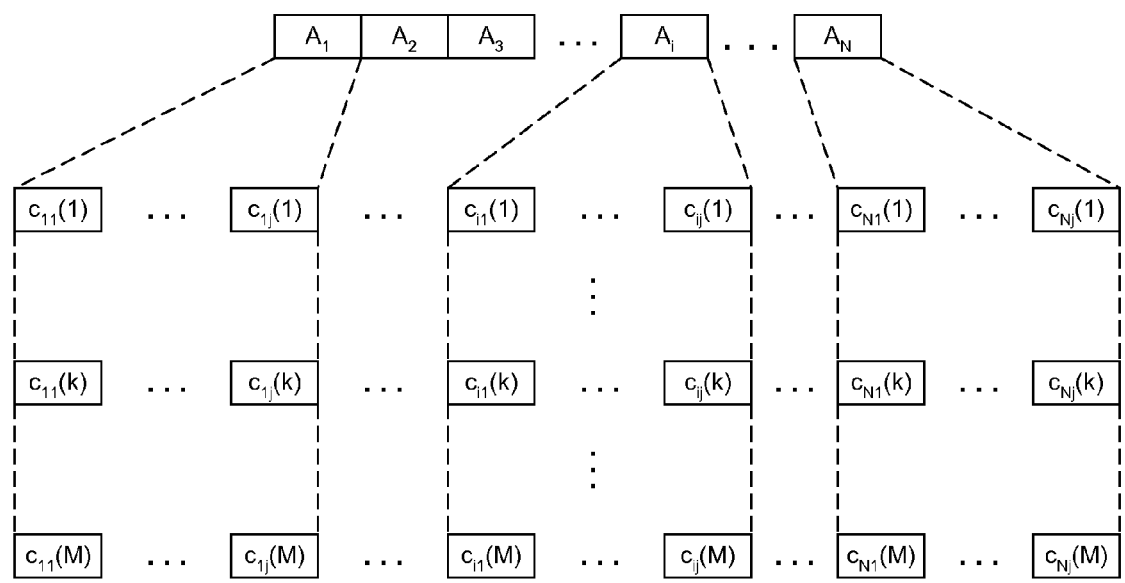
FIG. 3 is an illustration of metadata attributes and metadata values for a plurality of candidate entities in accordance with the instant disclosure.

In one embodiment, the characterization of document sets is performed by creating a multidimensional metadata vector, $v_t$, that models $R_t$. Preferably, all metadata attributes associated with the documents (both manual and automatically extracted) are used in constructing the metadata vector, although some lesser quantity of the available metadata attributes could be employed. The metadata attributes used to construct the metadata vector can include the various entity categories described above, e.g., people or locations, as well as other, non-entity based metadata associated with the documents. For each metadata attribute, the metadata vector comprises, for each identified metadata value, a count of the number of documents within the set associated with the given metadata value. An example of this is illustrated in FIG. 3. As shown in FIG. 3, a plurality of metadata attributes, $A_i$ for i=1 to N includes all of the metadata attributes used to characterize the set of documents. For a given document set, the metadata vector comprises a plurality of counts, $c_{ij}(k)$, as shown, where i designates a metadata attribute, j indexes the various metadata values for the i'th attribute and k represents a particular document set. Thus, for the first set of documents (i.e., k=1), each attribute value has an associated count, $c_{ij}(1)$, where j (the number of different values for a given i'th attribute) may vary from 0 to $J_i(1)$, the number of different values for the i'th attribute in the first set of documents. As shown, the number of different values for each attribute in a given document set may vary. In one embodiment, each of the value counts in the metadata vector is normalized, i.e., $$v_{ij} = \frac{c_{ij}}{|R_t|}.$$

Referring once again to FIG. 2, having characterized the first document set, processing continues at block 210 where processing of the candidate entities to determine their ranking according to their relevance to the topic, t, begins. To this end, it is determined at block 210 whether any candidate entities remain to be processed. If so, processing continues at block 212 where the next candidate entity is retrieved and, at block 214, used as the basis in an augmented query based on the original topic and the candidate entity, i.e., $t+e_i$, using the same query formation techniques described above. The resulting second set of documents is then characterized, at block 216, based on second metadata values corresponding to the second set of documents using the same techniques described above relative to block 208. Note that, in the multidimensional vector representation describe above, and as shown in FIG. 3, the number of values for a given attribute can vary between different documents, i.e., it is possible that $J_i(k_m) \neq J_i(k_n)$. To account for this, the overall dimension of the multidimensional vector may be equal to the total number of all attribute values for all of the attributes. For any document sets not having a particular value for a given attribute, a zero count may be used such that the same dimensionality is employed for each document set.

Thereafter, at block 218, the first and second document set characterizations are compared to determine their corresponding degree of similarity. In the case of the multidimensional vector representations, the comparison may be carried out as a vector comparison. In particular, in accordance with well known techniques, the cosine distance between the vectors for the first and second document set characterizations may be used:

$$d(v_{t+e_i}, v_t) = \frac{\sum_l v_{t,l} * v_{t+e_i,l}}{\|v_t\| * \|v_{t+e_i}\|} \qquad \text{Eq. 1}$$

Compared in this manner, smaller distances between the vectors correspond to greater similarity between the first and second document sets. In turn, greater similarity between first and second document sets leads to the inference that the candidate entity, $e_i$, giving rise to the second document set has increased relevance to the topic, t. Note that, although not shown in Equation 1, certain dimensions within the vectors, i.e., specific metadata values, could be weighted to have a greater or lesser effect on the distance calculation thereby making the relevancy determination more finely controlled. At block 220, a ranking for the candidate entity is determined according to the comparison result. In the case of the cosine distance of Equation 1, the ranking may be selected inversely relative to the distance, thereby capturing the intuition that smaller distances correspond to higher degrees of relevance.

The process of retrieving second documents sets, characterizing and comparing to the first document set is repeated for each of the one or more candidate entities as indicated. When no more candidate entities remain to be processed in this manner, processing continues at block 222 where an ordered listing according to the rankings for each of the candidate listings is provided. In the cosine distance embodiment, given the inverse relationship between distance and ranking, the candidate entity having the smallest distance, i.e., $\mathrm{argmin}_{e_i}(d(v_{t+e_i}, v_t))$, will be ranked highest. The resulting listing may be provided thereafter to the user (or requesting device).

Figure 4:
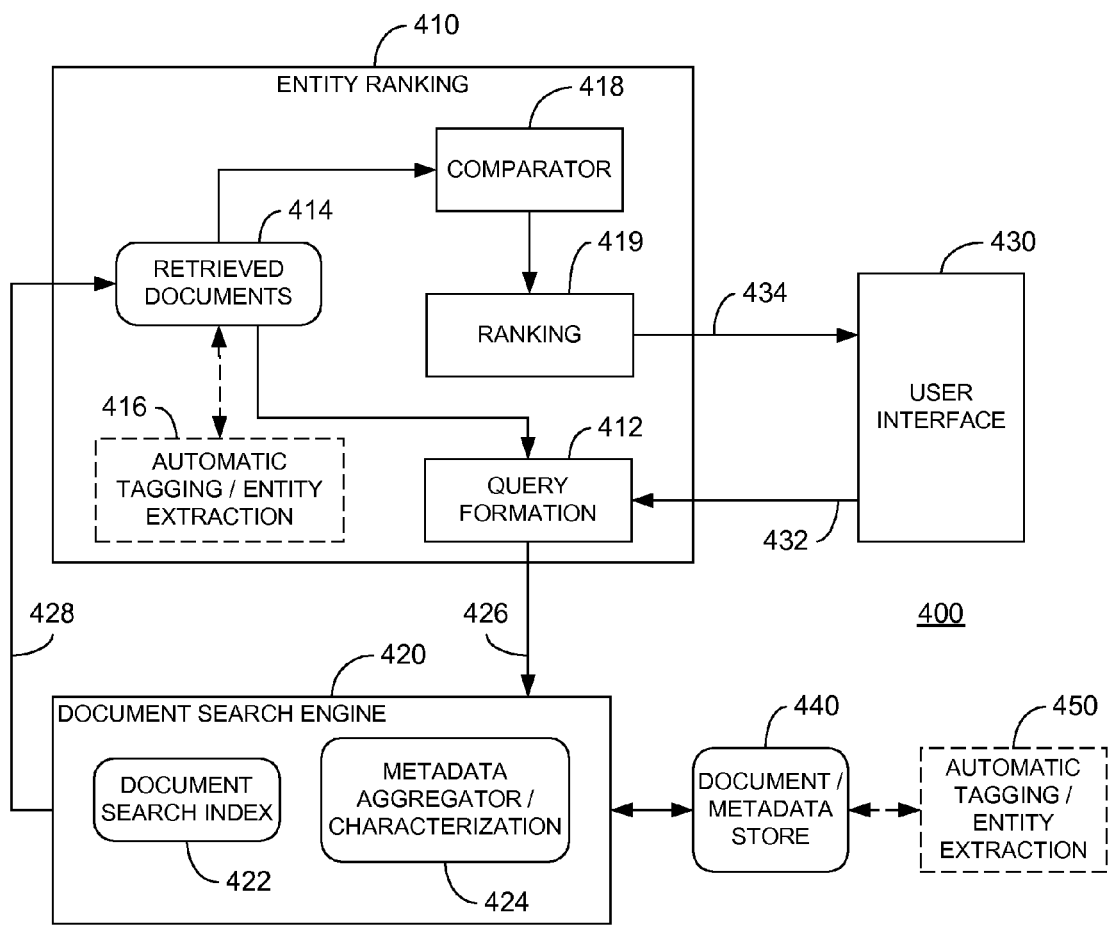
FIG. 4 is a block diagram of a system comprising an entity ranking component that may be used to implement the various techniques described herein.

Referring now to FIG. 4, a system 400 that includes an entity ranking component 410 is further described. As shown, the system 400 comprises the entity ranking component in communication with a search engine component 420 and a user interface component 430. The search engine component 420 communicates with a document/metadata store 440. One or more processing devices, e.g., the processing device 100 described above, may be used to implement the entity ranking component 410 and/or the user interface component 430. The user interface component 430, which may comprise a suitable graphical user interface as known in the art, may be directly coupled to the entity ranking component 410 as in the case where both components are implemented in the same processing device (e.g., a unified software application running on a desktop or laptop computer), or may communicate via one or more intervening networks as in the case where the user interface 430 is implemented in one processing device (e.g., an interface application running on a desktop or laptop computer) and the entity ranking component 410 is implemented in another processing device (e.g., a Web-based web application server). In a similar vein, the search engine component 420 may be implemented through either the same processing device or a different processing device, as the entity ranking component 410. The document/metadata store 440 comprises the one or more repositories noted above storing the documents to be searched and their associated metadata, and may be implemented using any suitable storage device(s), such as one or more appropriately programmed database servers or the like.

The entity ranking component 410 comprises a variety of sub-components for implementing various portions of the techniques described above. In particular, a query formation sub-component 412, responsive to topic and/or entity type inputs 432 received from the user interface 430, is provided to form the queries and augmented queries 426 and provide them to the search engine component 420. Once again, it is noted that the topic and/or entity type inputs 432 may be provided by a device other than the user interface 430. Information regarding the retrieved document sets and their aggregation of metadata 428, i.e., their characterizations, is provided by the search engine component 420 and placed in a retrieved documents store 414. Note that the metadata aggregation can be performed by a component other than the search engine, e.g., by the entity ranking component. The returned document information is used by the query formation sub-component 412 to formulate augmented queries, as noted above. A comparator sub-component 418 performs the similarity comparisons of the document set characterizations and provides the results to the ranking sub-component 419 that provides the listing of ranked entities 434, as described above.

As shown, the search engine component 420 includes a document search index 422 and metadata aggregator or characterization sub-component 424. In one embodiment, the document search index 422 is a data structure that stores information about words and metadata associated with documents, thereby permitting quick document query retrieval and ranking response. The metadata aggregator 424 performs the characterization process on the retrieved document sets. Furthermore, automatic tagging/entity extraction (i.e., the automated identification and tagging of entities in documents), if provided, may be performed in a variety of manners as shown in FIG. 4. In one embodiment, the automatic tagging/entity extraction 450 may be performed (as implemented by one or more suitable processing devices, which may include the processing devices used to implement the other components illustrated in FIG. 4) directly on the documents stored in the document/metadata store 440. Alternatively, the automatic tagging/entity extraction 416 may be optionally implemented as part of the entity ranking component 410 operating directly on any documents stored in retrieved document store 414.

The system 400 may be beneficially employed in a number of contexts where entity ranking would be advantageous. For example, in addition to the proposal writing application previously noted, in the context of project staffing, entity ranking can retrieve the expertise of any employee of an organization, even if this expertise was not explicitly specified by the employee. Using the above described techniques, expertise (expressed as a topic) can be derived by retrieving relevant information, such as clients for which the employee has worked, keywords that describe projects that the employee was involved in, locations in which the employee has been staffed, etc. Further still, a requesting user can also get a ranked list of people that are "related" to the employee in terms of their expertise and experience. This can be useful for identifying current and past supervisors, and identifying a list of other potential matches (employees) for a project. Yet another example application is vendor evaluation. Often, users do not have a good list of vendors to start from when attempting to source goods or services, causing them to spend considerable effort finding relevant vendors. Using the above-described techniques, at least an initial list of relevant vendors may be identified. These applications are but a few examples of the various applications that could benefit from the highly flexible entity ranking capabilities described herein.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. In a processing device in communication with a document repository, a method for assessing entities, the method comprising:
   retrieving, by the processing device, a first set of documents from the document repository based on a query, the first set of documents having first metadata values corresponding to a plurality of metadata attributes;
   characterizing, by the processing device, the first set of documents based on the first metadata values to provide a first document set characterization;
   storing, by the processing device, the first document set characterization to provide a stored first document set characterization;
   determining, by the processing device, at least one candidate entity based on the first set of documents;
   for each of the at least one candidate entity, retrieving, by the processing device, a second set of documents from the document repository based on the query and the candidate entity, the second set of documents having second metadata values corresponding to the plurality of metadata attributes;
   for each of the at least one candidate entity, characterizing, by the processing device, the second set of documents based on the second metadata values to provide a second document set characterization; and
   for each of the at least one candidate entity, comparing, by the processing device, the second document set characterization with the stored first document set characterization to determine a corresponding degree of similarity between the first document set characterization and the second document set characterization.

2. The method of claim 1, further comprising:
   for each of the at least one candidate entity, determining, by the processing device, a ranking for the candidate entity based on the corresponding similarity between the first document set characterization and the second document set characterization.

3. The method of claim 2, further comprising:
   providing, by the processing device, an ordered listing of the rankings for the at least one candidate entity.

4. The method of claim 1, wherein the first document set characterization and the second document set characterization each comprise a vector representation in which each of the first and second metadata values is a separate dimension, and wherein comparing the second document set characterization with the first document set characterization further comprises determining a distance between respective vector representations of the second document set characterization and the first document set characterization.

5. The method of claim 4, further comprising:
   applying, by the processing device, at least one weighting factor to a given metadata value of the vector representation when determining the distance between the respective vector representations of the second document set characterization and the first document set characterization.

6. The method of claim 1, further comprising:
   determining, by the processing device, an entity type of a plurality of entity types, wherein the at least one candidate entity is determined based on the entity type.

7. The method of claim 1, wherein determining the at least one candidate entity further comprises:
   determining, by the processing device, a citation frequency for each of the at least one candidate entity in at least some of the first set of documents; and
   identifying, by the processing device, a plurality of entities referenced in the first set of documents;
   determining, by the processing device and for each entity of the plurality of entities, a citation frequency for the entity in at least some of the first set of documents to provide a plurality of citation frequencies; and
   selecting, by the processing device, as the at least one candidate entity, at least a portion of the plurality of entities corresponding to that portion of the plurality of citation frequencies having largest values.

8. The method of claim 1, wherein the at least one candidate entity is determined based on the first metadata values for at least some of the first set of documents.

9. The method of claim 1, wherein the at least one candidate entity is determined based on text-based entity extraction on at least some of the first set of documents.

10. An apparatus comprising:
    at least one processor; and
    at least one storage device comprising instructions that, when executed, cause the at least one processor to:
    retrieve a first set of documents from a document repository based on a query, the first set of documents having first metadata values corresponding to a plurality of metadata attributes;
    characterize the first set of documents based on the first metadata values to provide a first document set characterization;
    store the first document set characterization to provide a stored first document set characterization;
    determine at least one candidate entity based on the first set of documents;
    for each of the at least one candidate entity, retrieve a second set of documents from the document repository based on the query and the candidate entity, the second set of documents having second metadata values corresponding to the plurality of metadata attributes;

for each of the at least one candidate entity, characterize the second set of documents based on the second metadata values to provide a second document set characterization; and for each of the at least one candidate entity, compare the second document set characterization with the first stored document set characterization to determine a corresponding degree of similarity between the first document set characterization and the second document set characterization.

11. The apparatus of claim 10, the at least one storage device further comprising instructions that, when executed, cause the at least one processor to:

for each of the at least one candidate entity, determine a ranking for the candidate entity based on the corresponding similarity between the first document set characterization and the second document set characterization.

12. The apparatus of claim 11, the at least one storage device further comprising instructions that, when executed, cause the at least one processor to:

provide an ordered listing of the rankings for the at least one candidate entity.

13. The apparatus of claim 10, wherein the first document set characterization and the second document set characterization each comprise a vector representation in which each of the first and second metadata values is a separate dimension, and wherein the instructions that, when executed, cause the at least one processor to compare the second document set characterization with the first document set characterization are further operative to determine a distance between respective vector representations of the second document set characterization and the first document set characterization.

14. The apparatus of claim 13, the at least one storage device further comprising instructions that, when executed, cause the at least one processor to:

apply at least one weighting factor to a given metadata value of the vector representation when determining the distance between the respective vector representations of the second document set characterization and the first document set characterization.

15. The apparatus of claim 10, the at least one storage device further comprising instructions that, when executed, cause the at least one processor to:

determine an entity type of a plurality of entity types, wherein the at least one candidate entity is determined based on the entity type.

16. The apparatus of claim 10, wherein the instructions that, when executed, cause the at least one processor to determine the at least one candidate entity are further operative to:

determine a citation frequency for each of the at least one candidate entity in at least some of the first set of documents; and identify a plurality of entities referenced in the first set of documents;

determine, for each entity of the plurality of entities, a citation frequency for the entity in at least some of the first set of documents to provide a plurality of citation frequencies; and select, as the at least one candidate entity, at least a portion of the plurality of entities corresponding to that portion of the plurality of citation frequencies having largest values.

17. The apparatus of claim 10, wherein the instructions that, when executed, cause the at least one processor to determine the at least one candidate entity are further operative to determine the at least one candidate entity based on the first metadata values for at least some of the first set of documents.

18. The apparatus of claim 10, wherein the instructions that, when executed, cause the at least one processor to determine the at least one candidate entity are further operative to determine the at least one candidate entity based on text-based entity extraction on at least some of the first set of documents.

* * * * *